Patented Oct. 28, 1930

1,780,027

UNITED STATES PATENT OFFICE

GUSTAV MAUTHE, OF COLOGNE-HOLWEIDE, AND ALFRED THAUSS, OF COLOGNE-DEUTZ, GERMANY, ASSIGNORS TO GENERAL ANILINE WORKS, INC., OF NEW YORK, N. Y., A CORPORATION OF DELAWARE

PRODUCT OBTAINABLE BY TREATING WOOL FAT WITH A SULPHONATING AGENT AND PROCESS OF PREPARING THE SAME

No Drawing. Application filed February 24, 1928, Serial No. 256,806, and in Germany March 1, 1927.

The present invention relates to new products obtainable by treating wool fat with a sulphonating agent and to a process of preparing the same.

We have found that when reacting with a sulphonating agent upon wool fat in the presence of a suitable phenol, such as phenol, a cresol, a chlorophenol, a naphthol, etc. semi-solid masses are obtainable which on boiling with water form emulsions which are stable, even when the reaction of the emulsion is acid. They form clear solutions on the addition of alkali to the emulsion and are easily salted out from either the alkaline neutral or acid medium by the addition of a neutral salt.

It is to be understood that the term "wool fat" is intended to include cleaned wool fat as well as raw wool fat, which still contains variable amounts of free fatty acid.

We prefer to effect the sulphonation by reacting with sulfuric acid monohydrate, chlorosulfonic acid or a mixture of them in the presence of a phenol on wool fat for a prolonged time, between a few hours and two days and at a temperature from about 5 to 40° C. The sulphonation can also be carried out by dissolving the wool fat-phenol mixture in a suitable organic solvent which is indifferent to sulphonating agents, such as chloro-hydro-carbons, hydro-aromatic compounds, carbon disulfide etc. and adding the sulphonating agent to this solution. In this latter case on working up semi-solid friable masses are obtainable.

Our new products are capable of varied application for example in the textile and leather industries.

The following examples will illustrate our invention without limiting it thereto:

*Example 1.*—60 parts by weight of ordinary commercial neutral wool fat and 30 parts by weight of phenol are stirred at 20 to 30° C. with 70 parts by weight of sulfuric acid monohydrate and then gradually 70 parts by weight of chloro-sulfonic acid, are added stirring being continued for several hours. The sulphonation mixture after standing for ½ day is poured upon a mixture of 100 parts by weight of ice and 50 parts by weight of a saturated aqueous sodium sulfate solution. The resulting mass is kneaded and separated from the aqueous acid solution. It is then stirred with 300 parts of water and almost completely neutralized with caustic soda lye. The remainder of the free acid is neutralized with sodium acetate and the mixture is heated for a considerable time to about 90° C., whereupon it separates into two layers. After cooling the upper layer represents a butter-like mass, which dissolves in hot water to an opalescent solution, which exhibits weakly acid reaction. Acetic acid and dilute mineral acid do not cause precipitation, the latter only cause a color change of the emulsion from yellow to greyish green. The colloidal solutions of the substance are easily salted out.

*Example 2.*—100 parts by weight of neutral wool fat and 35 parts by weight of phenol are dissolved with gentle warming in 100 parts by weight of tetrachloroethane and to the solution are added 200 parts by weight of sulfuric acid monohydrate at about 20° C. After standing for about 24 hours the ice cold mixture is poured into 1000 parts by weight of saturated aqueous sodium chloride solution. The resulting fat-like mass is separated and then freed from the excess of sulfuric acid by repeated washing with salt solution. A semi-solid mass is thus obtained, which dissolves in warm water to a clear opalescent weakly acid reacting solution.

*Example 3.*—50 parts by weight of neutral wool fat and 25 parts by weight of phenal are dissolved in 25 parts by weight of cyclohexane and to the solution are added 90 parts by weight of sulfuric acid monohydrate at about 10° C. The mixture is left to stand for some time at ordinary temperature and then poured into 500 parts by weight of cold saturated aqueous sodium chloride solution, stirred well and the resulting semi-solid mass is separated. The product can be completely freed from the excess of acid by repeated washing. The friable, soft mass thus obtainable is soluble in warm water giving a clear weakly opalescent solution.

*Example 4.*—60 parts by weight of raw wool fat are melted with 30 parts by weight of phenol and then the melt is stirred at a temperature of about 15 to 20° C. with 125 parts by weight of sulfruic acid monohydrate. After standing for some time the mass is poured into 1000 parts of water, wherein it dissolves on heating and separates on the surface in the form of an oil on addition of a neutral salt. The product is freed from acid by repeated solving in water and salting out and is obtained as a brown substance, which is semi-solid in the cold and soluble in water to a clear solution.

We claim:

1. The process which comprises treating wool fat with a sulphonating agent in the presence of a suitable phenol.

2. The process which comprises treating wool fat with a sulphonating agent in the presence of a suitable phenol at a temperature from about 5–40° C.

3. The process which comprises treating wool fat with a sulphonating agent in the presence of phenol.

4. The process which comprises treating wool fat with a sulphonating agent in the presence of phenol at a temperature from about 5–40° C.

5. The process which comprises treating wool fat with a sulphonating agent in the presence of a suitable phenol and an organic solvent.

6. The process which comprises treating wool fat in the presence of a suitable phenol and a suitable organic solvent with a sulphonating agent at a temperature from about 5–40° C.

7. The process which comprises treating wool fat in the presence of phenol and a suitable organic solvent with a sulphonating agent.

8. The process which comprises treating wool fat in the presence of phenol and a suitable organic solvent with a sulphonating agent at a temperature from about 5–40° C.

9. The process which comprises treating wool fat in the presence of a suitable phenol for several hours with sulfuric acid monohydrate at a temperature from about 5–40° C.

10. The process which comprises treating wool fat in the presence of phenol for about 24 hours with sulfuric acid monohydrate at a temperature from about 15–20° C.

11. The process which comprises treating wool fat in the presence of phenol and a suitable organic solvent for several hours with sulfuric acid monohydrate at a temperature from about 5–40° C.

12. The process which comprises treating wool fat in the presence of phenol and a suitable organic solvent for about 24 hours with sulfuric acid monohydrate at ordinary temperature.

13. The process which comprises treating neutral wool fat in the presence of phenol and tetrachloroethane for about 24 hours with sulfuric acid monohydrate at a temperature of about 20° C.

14. The new products obtainable by treating wool fat with a sulphonating agent in the presence of a phenol being semi-solid and friable masses forming on boiling with water stable emulsions which form clear solutions when rendered alkaline, said products being salted out from their neutral alkaline or acid solutions by the addition of a neutral salt.

15. The new product obtainable by treating neutral wool fat with sulfuric acid monohydrate in the presence of phenol being a semi-solid friable mass which on boiling with water forms a stable emulsion which forms a clear solution when rendered alkaline, said product being salted out from its neutral alkaline and acid solutions by the addition of a neutral salt.

In testimony whereof we have hereunto set our hands.

GUSTAV MAUTHE.
ALFRED THAUSS.